Nov. 12, 1968  W. WOLTCHE  3,410,632
WIDE-ANGLE OBJECTIVE WITH NEGATIVE FRONT COMPONENT AND
MULTILENS POSITIVE COMPONENT
Filed May 24, 1965  3 Sheets-Sheet 1

Inventor:
Walter Wöltche
BY Karl F. Ross
Attorney

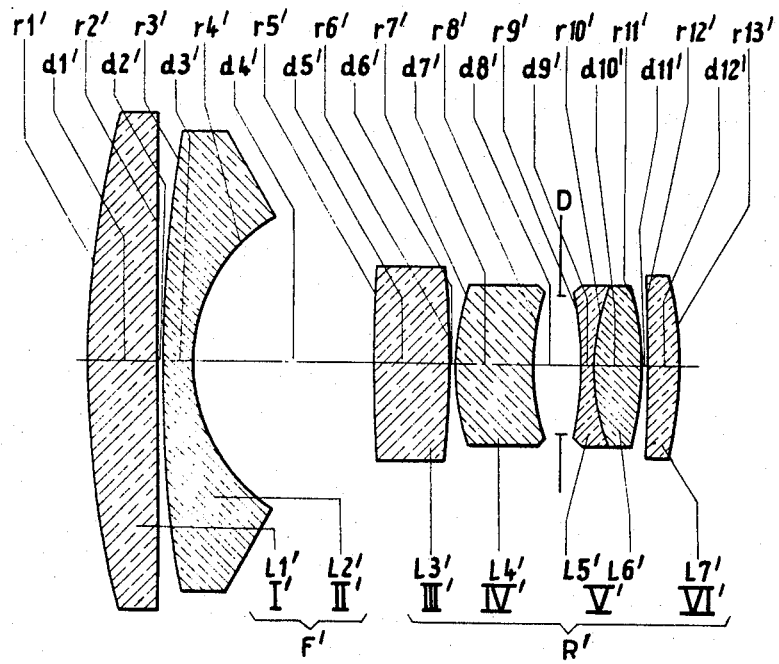
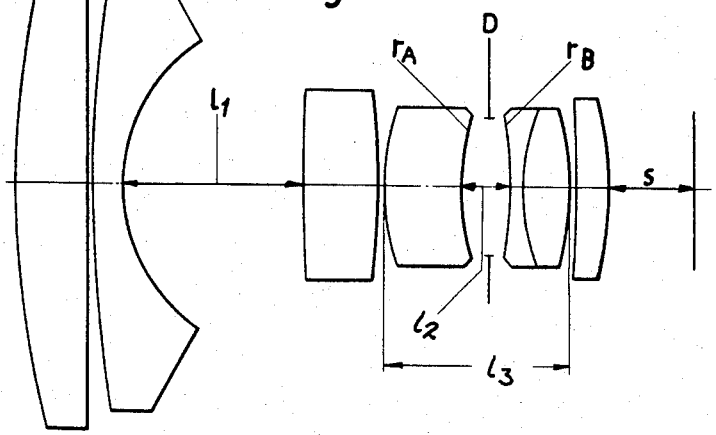

Inventor:
Walter Woltche
Karl G. Ross
Attorney

United States Patent Office

3,410,632
Patented Nov. 12, 1968

3,410,632
WIDE-ANGLE OBJECTIVE WITH NEGATIVE FRONT COMPONENT AND MULTILENS POSITIVE COMPONENT
Walter Woltche, Bad Kreuznach, Germany, assignor to Jos. Schneider & Co. Optische Werke, Kreuznach, Germany, a corporation of Germany
Filed May 24, 1965, Ser. No. 458,189
Claims priority, application Germany, May 30, 1964, Sch 35,253
3 Claims. (Cl. 350—214)

ABSTRACT OF THE DISCLOSURE

Wide-angle objective with negative front component of 1 to 3 lens members and positive rear component of four lens members, the second or third lens member of the latter component being a doublet.

---

My present invention relates to a wide-angle objective for photographic or cinematographic cameras.

In commonly assigned copending application Ser. No. 355,829, filed Mar. 30, 1964 by Rudolph Solisch and me, now Patent No. 3,350,157, there has been disclosed an optical objective of this general type wherein two meniscus-shaped lens members define a diaphragm space by their confronting concave surfaces and are bracketed by two lens groups of positive refractivity. The objective specifically described in that application has an aperture ratio of about 1:1 and a relatively large back-focal length exceeding 50% of the overall focal length of the objective.

In wide-angle objectives of short overall focal length it is often desirable, for physical as well as optical considerations, to operate with even larger ratios of back-focal length to overall focal length. For purposes of the present description, wide-angle objectives may be defined as those having an angle of view of about 60° or more.

The general object of my invention is to provide a wide-angle objective of the general character set forth wherein the ratio of back-focal length to overall focal length is about 1:1 or greater.

An objective according to my present invention represents, basically, a modification of the objective disclosed in the aforementioned copending application according to which the aforedescribed combination of meniscus-shaped members proximal to the diaphragm space and positive members bracketing the menisci is constituted by a positive rear component of a two-component system whose negative front component, consisting of one or more lenses, is separated from this rear component by an air space smaller than the overall focal length of the system, the individual focal length of this negative front component having an absolute value less than twice that of the overall focal length. In contradistinction to the system of the copending application, the more forwardly disposed meniscus (i.e. the one on the object side of the diaphragm space) may be of either positive or negative refractivity while the associated image-side meniscus, according to a specific feature of this invention, is positively refracting. Both these members should be of relatively low power, with an individual focal length upwards of about twice the overall focal length of the system; in the forward meniscus, whose refractivity is not critical, there is no upper limit for the individual focal length whereas in the rear meniscus this upper limit is around ten times the overall focal length.

Wide-angle objectives of this construction, with a negative front component of one or more members and a positive rear component consisting of four air-spaced members, have been found to give a very satisfactory optical performance with field angles upwards of about 60° and relative apertures up to about 1:2.8.

For the correction of asymmetrical aberrations, pursuant to a further feature of my invention, the radii of the confronting concave meniscus surfaces at the diaphragm space should be so dimensioned that the absolute length of the radius of the object-side meniscus is less than or at most equal to that of the image-side meniscus.

Furthermore, according to still another feature of this invention, the distance of the confronting inner vertices of these menisci (i.e. the length of the diaphragm space) should be less than 15% of the overall focal length $f$ while the thickness of these menisci is so chosen that their outer vertices, i.e. those facing away from the diaphragm space, are separated by a distance ranging between $0.37$ and $0.6f$. This arrangement affords a compact construction with good flattening of the image field.

The forward meniscus, preceded by a strongly collective lens member, serves mainly to concentrate the incident light rays near the axis of the system in the region of the diaphragm which it does by virtue of the fact that its forward surface is distinctly convex and that its own axial thickness lies between about one-third and one-half of the aforementioned distance between the outer vertices, this thickness being always greater than the width of the diaphragm space.

Still another feature of the invention, designed to suppress chromatic aberrations, resides in the construction of at least one meniscus adjacent the diaphragm space as a doublet composed of two constituent lenses of opposite refractivity whose dispersion constants or Abbé numbers $v$ are so chosen that the intervening cemented surface overcorrects for longitudinal chromatic aberrations. More particularly, this cemented surface should be negatively refracting and the constituent lens of higher refractive index (preferably a biconcave element adjoining the diaphragm space) should have the lower $v$ value.

The invention will be described hereinafter with greater detail, reference being made to the accompanying drawing in which:

FIG. 2 is a view similar to FIG. 1, showing a modified system with two air-spaced lens members constituting the negative front component;

FIGS. 1a, 2a and 3a are diagrammatic views of the system of FIGS. 1, 2 and 3, respectively, identifying certain common parameters of these systems.

Figure 1:
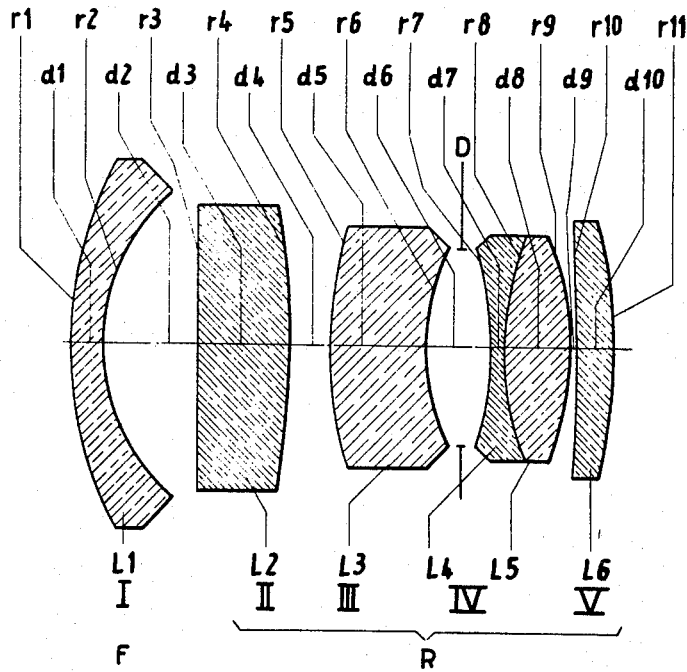
FIG. 1 illustrates, in conventional sectional representation, a simple objective system embodying the invention with a negative front component comprising a single lens member.

In FIG. 1 I have shown an objective system according to my invention, consisting of a negatively refracting front component F and a positively refracting rear component R. Component F, in this embodiment, is represented by a single dispersive lens member I in the form of a negative meniscus L1 with radii $r_1$, $r_2$ and thickness $d_1$. Component R, separated from component F by an air space $d_2$, consists of four members II, III, IV and V. These members are, respectively, a positive lens L2 (radii $r_3$, $r_4$, thickness $d_3$), a meniscus-shaped singlet L3 (radii $r_5$, $r_6$, thickness $d_5$) of low refractive power (here negative) following the lens L2 with a spacing $d_4$ and adjoining a diaphragm space $d_6$, a meniscus-shaped doublet of low collective power composed of a biconcave lens L4 (radii $r_7$, $r_8$, thickness $d_7$) and a biconvex lens L5 (radii $r_8$, $r_9$, thickness $d_8$) on the image side of the diaphragm space $d_6$, and a positive rear lens L6 (radii $r_{10}$, $r_{11}$, thickness $d_{10}$) separated from lens member IV by an air space $d_9$.

Representative values of the parameters of the system of FIG. 1, for an objective with an aperture ratio of 1:2.8, a field angle of 63° and a back-focal length of 105.2 units (e.g. millimeters) based upon an overall focal length $f$ of 100 units, are given in the following Table I. These parameters include the radii of curvature $r_1$–$r_{11}$, the thicknesses and separations $d_1$–$d_{10}$ and the refractive indices $n_e$ and Abbé numbers $\nu_e$ based upon the E-line of the spectrum.

tive lens L3' (radii $r_{5'}$, $r_{6'}$, thickness $d_{5'}$) separated from the following meniscus-shaped singlet L4' (radii $r_{7'}$, $r_{8'}$, thickness $d_{7'}$), constituting the second member IV' of component R', by an air space $d_{6'}$. Diaphragm space $d_{8'}$ is bounded on the image side by a meniscus-shaped member V' of positive refractivity, again composed of a biconcave lens L5' (radii $r_{9'}$, $r_{10'}$, thickness $d_{9'}$) and a biconvex lens L6' (radii $r_{10'}$, $r_{11'}$, thickness $d_{10'}$). The last member VI' of the system is a positive singlet L7'

TABLE I

| Component | Member | Lens | Radii | Thicknesses and separations | $n_e$ | $\nu_e$ |
|---|---|---|---|---|---|---|
| F | I | L1 | $r_1 = + 67.56$ <br> $r_2 = + 35.23$ | $d_1 = 5.62$ | 1.47236 | 67.10 |
|  |  |  |  | $d_2 = 16.87$ | Air space |  |
|  | II | L2 | $r_3 = -954.17$ <br> $r_4 = -133.68$ | $d_3 = 16.59$ | 1.69660 | 53.18 |
|  |  |  |  | $d_4 = 7.03$ | Air space |  |
|  | III | L3 | $r_5 = + 43.89$ <br> $r_6 = + 39.19$ | $d_5 = 16.87$ | 1.74793 | 44.65 |
| R |  |  |  | $d_6 = 11.25$ | Diaphragm space |  |
|  | IV | L4 | $r_7 = - 59.18$ <br> $r_8 = + 51.90$ | $d_7 = 2.25$ | 1.62410 | 36.10 |
|  |  | L5 | $r_9 = - 51.90$ | $d_8 = 12.65$ | 1.62287 | 60.06 |
|  |  |  |  | $d_9 = 0.28$ | Air space |  |
|  | V | L6 | $r_{10} = -478.21$ <br> $r_{11} = - 82.57$ | $d_{10} = 7.03$ | 1.69400 | 54.60 |
| Total d |  |  |  | 96.44 |  |  |

In FIG. 2 I show an alternate embodiment whose front component F' is composed of two air-spaced lens members I', II', respectively represented by a positive singlet L1' (radii $r_{1'}$, $r_{2'}$ and thickness $d_{1'}$) and a negative meniscus L2' (radii $r_{3'}$, $r_{4'}$, thickness $d_{3'}$) with intervening air space $d_{2'}$. A large intercomponent air space $d_{4'}$ separates lens member II' from the first member III' of the associated rear component R', the member III' being similar to member II of FIG. 1 and consisting of a posi- (radii $r_{12'}$, $r_{13'}$, thickness $d_{12'}$) following the doublet V' with a separation $d_{11'}$.

Representative values of the parameters $r_{1'}$–$r_{13'}$, $d_{1'}$–$d_{12'}$, $n_e$ and $\nu_e$ of the system of FIG. 2, defining an objective of an aperture ratio of 1:4, a field angle of 75° and a back-focal length of 113.4 units (based upon an overall focal length $f=100$), are listed in the following Table II.

TABLE II

| Component | Member | Lens | Radii | Thicknesses and separations | $n_e$ | $\nu_e$ |
|---|---|---|---|---|---|---|
| F' | I' | L1' | $r_{1'} = +209.46$ <br> $r_{2'} = \infty$ | $d_{1'} = 15.70$ | 1.62287 | 60.06 |
|  |  |  |  | $d_{2'} = 0.35$ | Air space |  |
|  | II' | L2' | $r_{3'} = +313.89$ <br> $r_{4'} = + 37.09$ | $d_{3'} = 6.28$ | 1.51871 | 63.96 |
|  |  |  |  | $d_{4'} = 40.47$ | Air space |  |
|  | III' | L3' | $r_{5'} = +378.93$ <br> $r_{6'} = -209.46$ | $d_{5'} = 17.44$ | 1.70586 | 40.87 |
|  |  |  |  | $d_{6'} = 0.35$ | Air space |  |
|  | IV' | L4' | $r_{7'} = + 54.12$ <br> $r_{8'} = + 52.69$ | $d_{7'} = 17.79$ | 1.70189 | 38.38 |
| R' |  |  |  | $d_{8'} = 9.42$ | Diaphragm space |  |
|  | V' | L5' <br> L6' | $r_{9'} = - 94.38$ <br> $r_{10'} = + 44.80$ <br> $r_{11'} = - 63.29$ | $d_{9'} = 2.79$ <br> $d_{10'} = 12.21$ | 1.70442 <br> 1.62287 | 34.67 <br> 60.06 |
|  |  |  |  | $d_{11'} = 0.35$ | Air space |  |
|  | VI' | L7' | $r_{12'} = -302.86$ <br> $r_{13'} = - 80.32$ | $d_{12'} = 6.98$ | 1.69660 | 53.18 |
| Total d |  |  |  | 130.13 |  |  |

Figure 3:
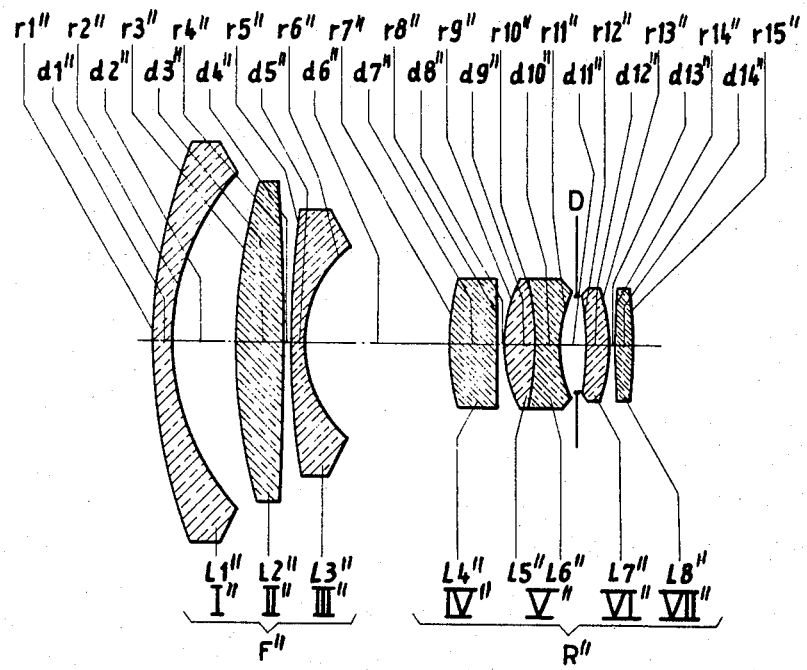
FIG. 3 is another view similar to FIG. 1, showing a system with a three-member negative front component.

FIG. 3 illustrates a further embodiment whose front component F″ is composed of three air-spaced members I″, II″ and III″ respectively constituted by a first negative meniscus L1″ (radii $r_{1''}$, $r_{2''}$ and thickness $d_{1''}$), a biconvex singlet L2″ (radii $r_{3''}$, $r_{4''}$, thickness $d_{3''}$) and a second negative meniscus L3″ (radii $r_{5''}$, $r_{6''}$, thickness $d_{5''}$), the intervening air spaces having been designated $d_{2''}$ and $d_{4''}$. Separated from component F″ by a large air space $d_{6''}$ is a four-member rear component R″ whose members have been designated IV″, V″, VI″ and VII″. It will be noted that the first member IV″ and the last member VII″, respectively represented by a positive singlet L4″ (radii $r_{7''}$, $r_{8''}$, thickness $d_{7''}$) and by another positive singlet L8″ (radii $r_{14''}$, $r_{15''}$, thickness $d_{14''}$), are generally similar to the corresponding members R and R′ in FIGS. 1 and 2 but that, in contradistinction to these two preceding embodiments, the second member V″ of component R″ is now a doublet, constituted by a biconvex lens L5″ (radii $r_{9''}$, $r_{10''}$, thickness $d_{9''}$) and a biconcave lens L6″ (radii $r_{10''}$, $r_{11''}$, thickness $d_{10''}$), whereas the third member VI″ is a positive singlet L7″ (radii $r_{12''}$, $r_{13''}$, thickness $d_{12''}$) separated from member V″ by the diaphragm space $d_{11''}$. The spaces intervening between members IV″ and V″ and between VI″ and VII″ have been respectively designated $d_{8''}$ and $d_{13''}$.

Representative parameters of the system of FIG. 3, constituting an objective with a relative aperture of 1:2.8, a field angle of 80° and a back-focal length of 146.58 units (with overall length $f=100$), i.e. the radii $r_{1''}$–$r_{15''}$, the thicknesses and separations $d_{1''}$–$d_{14''}$ and the associated refractive indices $n_e$ and Abbé numbers $\nu_e$, are given in the following Table III.

the length $l_2$ of the diaphragm space $d_6$, $d_8'$ or $d_{11''}$ containing the diaphragm D, the distance $l_3$, between the vertices of the convex outer surfaces $r_5$, $r_{7'}$ or $r_{9''}$ and $r_9$, $r_{11'}$ or $r_{13''}$ of the two confronting menisci, the radius $r_A$ of the concave surfaces $r_6$, $r_{8'}$ or $r_{11''}$ of the first meniscus, the radius $r_B$ of the concave surfaces $r_7$, $r_{9'}$ or $r_{12''}$ of the second meniscus, and the back-focal length $s$. These parameters or their ratios have been summarized for comparison, along with the individual focal length $f_F$ of the front component and the individual focal length $f_B$ of the rear meniscus IV, V′ or VI″, in terms of the overall focal length $f$ in the following Table IV.

TABLE IV

Figure 1A:
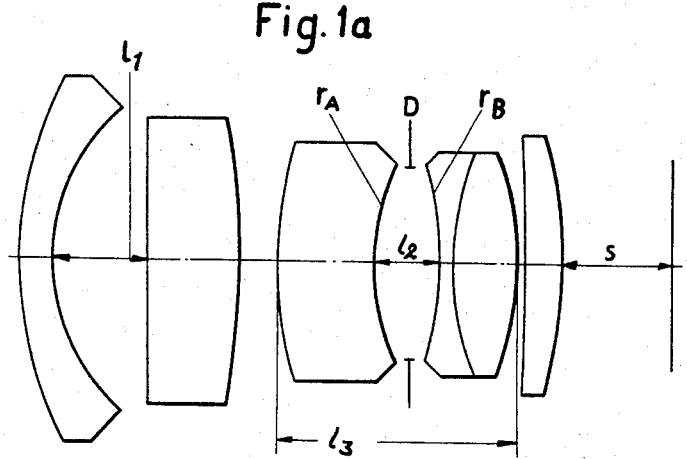
Figure 3A:
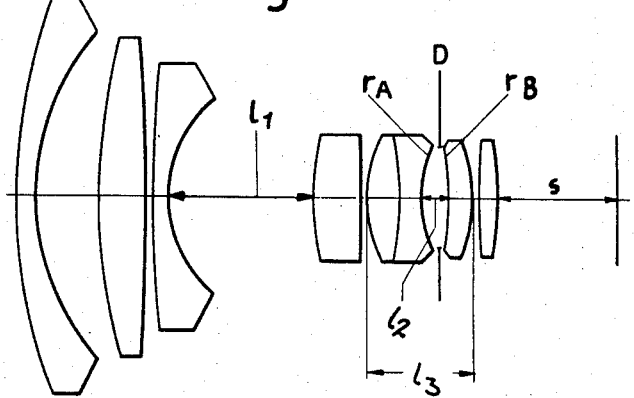

|  | $s$ | $f_F$ | $l_1$ | $f_B$ | $l_3$ | $l_2$ | $r_A/r_B$ |
|---|---|---|---|---|---|---|---|
| Fig. 1a | 105.2$f$ | −1.65$f$ | 0.17$f$ | +3.85$f$ | 0.43$f$ | 11.25 | 0.66 |
| Fig. 2a | 130.4$f$ | −1.15$f$ | 0.40$f$ | +7.44$f$ | 0.42$f$ | 9.42 | 0.56 |
| Fig. 3a | 146.5$f$ | −1.23$f$ | 0.77$f$ | +3.24$f$ | 0.51$f$ | 11.77 | 0.49 |

It will be noted that the first and fourth members of the rear component in each of the specifically disclosed systems are strongly collective, as compared with the interposed meniscus-shaped member, the individual focal length of each of these collective members being less than twice the overall focal length $f$ of the system.

I claim:
1. An optical objective system composed of a negatively refracting front component and a positively refracting rear component air-spaced from said front component, said rear component consisting of four air-spaced lens members including a strongly collective first member, a meniscus-shaped second member of low refractive power having a convex front surface and a concave rear surface, a meniscus-shaped collective third member having a concave front surface and a convex rear surface, said concave surfaces encompassing a diaphragm space, and a strongly collective fourth member, said front component being singlet, said third member being a doublet, the numerical values of the radii $r_1$ or $r_{11}$ and the thicknesses and separations $d_1$ to $d_{10}$ of said singlet L1, said first member L2,

TABLE III

| Component | Member | Lens | Radii | Thicknesses and separations | $n_e$ | $\nu_e$ |
|---|---|---|---|---|---|---|
| F″ | I″ | L1″ | $r_{1''} = +266.77$ | $d_{1''} = 9.81$ | 1.51871 | 63.96 |
|  |  |  | $r_{2''} = +121.58$ | $d_{2''} = 31.38$ | Air space |  |
|  | II″ | L2″ | $r_{3''} = +286.39$ | $d_{3''} = 23.54$ | 1.72823 | 37.81 |
|  |  |  | $r_{4''} = -1006.28$ | $d_{4''} = 0.39$ | Air space |  |
|  | III″ | L3″ | $r_{5''} = +430.21$ | $d_{5''} = 7.58$ | 1.62287 | 60.06 |
|  |  |  | $r_{6''} = + 59.63$ | $d_{6''} = 76.50$ | Air space |  |
| R″ | IV″ | L4″ | $r_{7''} = +129.11$ | $d_{7''} = 23.54$ | 1.74703 | 27.82 |
|  |  |  | $r_{8''} = \infty$ | $d_{8''} = 2.75$ | Air space |  |
|  | V″ | L5″ | $r_{9''} = + 67.32$ | $d_{9''} = 15.69$ | 1.55440 | 63.22 |
|  |  | L6″ | $r_{10''} = -120.52$ | $d_{10''} = 13.73$ | 1.72732 | 29.07 |
|  |  |  | $r_{11''} = + 62.14$ | $d_{11''} = 11.77$ | Diaphragm space |  |
|  | VI″ | L7″ | $r_{12''} = -127.78$ | $d_{12''} = 9.81$ | 1.62287 | 60.06 |
|  |  |  | $r_{13''} = - 80.54$ | $d_{13''} = 0.39$ | Air space |  |
|  | VII″ | L8″ | $r_{14''} = +366.69$ | $d_{14''} = 9.81$ | 1.62287 | 60.06 |
|  |  |  | $r_{15''} = -144.88$ |  |  |  |
| Total $d$ |  |  |  | 236.96 |  |  |

In FIGS. 1a, 2a and 3a I have indicated certain common parameters of the three systems described above, i.e. the length $l_1$ of the intercomponent space $d_2$, $d_4'$ or $d_{6''}$, said second member L3, the constituent lenses L4 and L5 of said third member, and said fourth member L6, based upon an overall focal length of numerical value 100, and of their refractive indices $n_e$ and dispersion constants $\nu_e$ being substantially as given in the following table:

| Member | Lens | Radii | Thicknesses and separations | nc | νe |
|---|---|---|---|---|---|
| I | L1 | $r_1 = +67.56$ | $d_1 = 5.62$ | 1.47236 | 67.10 |
|  |  | $r_2 + 35.23$ | $d_2 = 16.87$ | Air space |  |
| II | L2 | $r_3 = -954.17$ | $d_3 = 16.59$ | 1.69660 | 53.18 |
|  |  | $r_4 = -133.68$ | $d_4 = 7.03$ | Air space |  |
| III | L3 | $r_5 = +43.89$ | $d_5 = 16.87$ | 1.74793 | 44.65 |
|  |  | $r_6 = +39.19$ | $d_6 = 11.25$ | Diaphragm space |  |
| IV | L4 | $r_7 = -59.18$ | $d_7 = 2.25$ | 1.62410 | 36.10 |
|  | L5 | $r_8 = +51.90$ | $d_8 = 12.65$ | 1.62287 | 60.06 |
|  |  | $r_9 = -51.90$ | $d_9 = 0.28$ | Air space |  |
| V | L6 | $r_{10} = -478.21$ | $d_{10} = 7.03$ | 1.69400 | 54.60 |
|  |  | $r_{11} = -82.57$ |  |  |  |

2. An optical objective system composed of a negatively refracting front component and a positively refracting rear component air-spaced from said front component, said rear component consisting of four air-spaced lens members including a strongly collective first member, a meniscus-shaped second member of low refractive power having a convex front surface and a concave rear surface, a meniscus-shaped collective third member having a concave front surface and a convex rear surface, said concave surfaces encompassing a diaphragm space, and a strongly collective fourth member, said front component consisting of a positive first lens and a negative second lens air-spaced from said first lens, said third member being a doublet, the numerical values of the radii $r_{1'}$ to $r_{13'}$ and the thicknesses and separations $d_{1'}$ to $d_{12'}$ of said first lens L1', said second lens L2', said first member L3', said second member L4', the constituent lenses L5' and L6' of said third member, and the fourth member L7', based upon an overall focal length of numerical value 100, and of their refractive indices $n_e$ and dispersion constants $\nu_e$ being substantially as given in the following table:

| Member | Lens | Radii | Thicknesses and separations | $n_e$ | $\nu_e$ |
|---|---|---|---|---|---|
| I | L1' | $r_{1'} = +209.46$ | $d_{1'} = 15.70$ | 1.62287 | 60.06 |
|  |  | $r_{2'} = \infty$ | $d_{2'} = 0.35$ | Air space |  |
| II' | L2' | $r_{3'} = +313.89$ | $d_{3'} = 6.28$ | 1.51871 | 63.96 |
|  |  | $r_{4'} = +37.09$ | $d_{4'} = 40.47$ | Air space |  |
| III' | L3' | $r_{5'} = +378.93$ | $d_{5'} = 17.44$ | 1.70586 | 40.87 |
|  |  | $r_{6'} = -209.46$ | $d_{6'} = 0.35$ | Air space |  |
| IV' | L4' | $r_{7'} = +54.12$ | $d_{7'} = 17.79$ | 1.70189 | 38.38 |
|  |  | $r_{8'} = +52.69$ | $d_{8'} = 9.42$ | Diaphragm space |  |
| V' | L5' | $r_{9'} = -94.38$ | $d_{9'} = 2.79$ | 1.70442 | 34.67 |
|  | L6' | $r_{10'} = +44.80$ | $d_{10'} = 12.21$ | 1.62287 | 60.06 |
|  |  | $r_{11'} = -63.29$ | $d_{11'} = 0.35$ | Air space |  |
| VI' | L7' | $r_{12'} = -302.86$ | $d_{12'} = 6.98$ | 1.69660 | 53.18 |
|  |  | $r_{13'} = -80.32$ |  |  |  |

3. An optical objective system composed of a negatively refracting front component and a positively refracting rear component air-spaced from said front component, said rear component consisting of four air-spaced lens members including a strongly collective first member, a meniscus-shaped second member of low refractive power having a convex front surface and a concave rear surface, a meniscus-shaped collective third member having a concave front surface and a convex rear surface, said concave surfaces encompassing a diaphragm space, and a strongly collective fourth member, said front component consisting of a negative first lens, a positive second lens and a negative third lens air-spaced from one another, said second member being a doublet, the numerical values of the radii $r_{1''}$ to $r_{15''}$ and the thicknesses and separations $d_{1''}$ to $d_{14''}$ of said first lens L1'', said second lens L2'', said third lens L3'', said first member L4'', the constituent lenses L5'' and L6'' of said second member, said third member L7'', and said fourth member L8'', based upon an overall focal length of numerical value 100, and of their refractive indices $n_e$ and dispersion constants $\nu_e$ being substantially as given in the following table:

| Member | Lens | Radii | Thicknesses and separations | $n_e$ | $\nu_e$ |
|---|---|---|---|---|---|
| I' | L1'' | $r_{1''} = +266.77$ | $d_{1''} = 9.81$ | 1.51871 | 63.96 |
|  |  | $r_{2''} = +121.58$ | $d_{2''} = 31.38$ | Air space |  |
| II' | L2'' | $r_{3''} = +286.39$ | $d_{3''} = 23.54$ | 1.72823 | 37.81 |
|  |  | $r_{4''} = -1006.28$ | $d_{4''} = 0.39$ | Air space |  |
| III' | L3'' | $r_{5''} = +430.21$ | $d_{5''} = 7.85$ | 1.62287 | 60.06 |
|  |  | $r_{6''} = +59.63$ | $d_{6''} = 76.50$ | Air space |  |
| IV' | L4'' | $r_{7''} = +129.11$ | $d_{7''} = 23.54$ | 1.74703 | 27.82 |
|  |  | $r_{8''} = \infty$ | $d_{8''} = 2.75$ | Air space |  |
| V' | L5'' | $r_{9''} = +67.32$ | $d_{9''} = 15.69$ | 1.55440 | 63.22 |
|  | L6'' | $r_{10''} = -120.52$ | $d_{10''} = 13.73$ | 1.72732 | 29.07 |
|  |  | $r_{11''} = +62.14$ | $d_{11''} = 11.77$ | Diaphragm space |  |
| VI' | L7'' | $r_{12''} = -127.78$ | $d_{12''} = 9.81$ | 1.62287 | 60.06 |
|  |  | $r_{13''} = -80.54$ | $d_{13''} = 0.39$ | Air space |  |
| VII' | L8'' | $r_{14''} = +366.69$ | $d_{14''} = 9.81$ | 1.62287 | 60.06 |
|  |  | $r_{15''} = -144.88$ |  |  |  |

References Cited

UNITED STATES PATENTS 2,649,022 8/1953 Angenieux _____ 350—216
2,696,758 12/1954 Angenieux _____ 350—215
2,793,565 5/1957 Zöllner _____ 350—216

FOREIGN PATENTS 931,063 7/1963 Great Britain.
1,192,221 4/1959 France.

DAVID SCHONBERG, *Primary Examiner.*

R. J. STERN, *Assistant Examiner.*